United States Patent [19]

Fender et al.

[11] 4,422,943

[45] Dec. 27, 1983

[54] METHOD FOR PRECIPITATION OF HEAVY METAL SULFIDES

[75] Inventors: Ronald G. Fender, Thorndale; Alan S. MacGregor, Chadds Ford, both of Pa.

[73] Assignee: Environmental Resources Management, Inc., West Chester, Pa.

[21] Appl. No.: 380,815

[22] Filed: May 21, 1982

[51] Int. Cl.$^3$ ............................................. C02F 1/52
[52] U.S. Cl. .................................. 210/716; 210/724; 210/726; 210/912; 210/914
[58] Field of Search ............... 210/912, 724, 726, 719, 210/720–723, 913, 914, 716, 717; 423/561 R, 561 B, 571, 48

[56] References Cited

U.S. PATENT DOCUMENTS

| | | | |
|---|---|---|---|
| 2,145,816 | 1/1939 | Stoops | 210/912 |
| 3,740,331 | 6/1973 | Anderson et al. | 210/912 |
| 4,086,150 | 4/1978 | Kindl et al. | 210/912 |
| 4,102,784 | 7/1978 | Schlauch | 210/912 |
| 4,127,989 | 12/1978 | Mickelson . | |
| 4,147,626 | 4/1979 | Findlay et al. | 210/724 |
| 4,329,224 | 5/1982 | Kim | 210/912 |
| 4,354,942 | 10/1982 | Kaczur et al. | 210/914 |

FOREIGN PATENT DOCUMENTS

| | | | |
|---|---|---|---|
| 49-69544 | 7/1974 | Japan | 210/913 |
| 51-88858 | 8/1976 | Japan | 210/913 |
| 757603 | 8/1980 | U.S.S.R. | 423/48 |

OTHER PUBLICATIONS

Chem. Abstracts 94:197284(r), "Reduction and Removal of Hexavalent Chromium from Effluent Water Using Pyrites"; (1981).

*Primary Examiner*—Benoît Castel
*Attorney, Agent, or Firm*—Sixbey, Friedman & Leedom

[57] ABSTRACT

A method for the removal of heavy metal ions from an aqueous solution which comprises the steps of admixing an aqueous slurry of $FeS_2$ with a heavy metal ion bearing aqueous solution at a pH above 7, preferably 8–12, the slurry providing at least the stoichiometric amount of $FeS_2$, preferably 2 to 6 times the stoichiometric amount of $FeS_2$, for precipitating the heavy metal ions from the solution as sulfides and separating the precipitated sulfides from the aqueous solution. Desirably, a portion of the heavy metal ions are precipitated from the solution as heavy metal hydroxides and the precipitated hydroxides are separated from the solution prior to admixing the solution with the $FeS_2$ slurry.

12 Claims, No Drawings

METHOD FOR PRECIPITATION OF HEAVY METAL SULFIDES

DESCRIPTION

1. Technical Field

The present invention relates to a method for removing heavy metal ions from aqueous solutions and, more particularly, to a method for removing heavy metal ions from wastewater by sulfide precipitation.

2. Background Art

The most common method for removal of dissolved heavy metal ions from wastewater is hydroxide precipitation. Generally, alkaline chemicals, such as lime or caustic, are added to raise the wastewater pH to levels at which the heavy metal hydroxides are least soluble and will precipitate. For example, certain heavy metal hydroxides, such as the hydroxides of zinc, copper, lead, cadmium and chromium, are amphoteric compounds which exhibit minimum solubility in the pH range of about 8 to 12, depending upon the presence of competing chemical species in the wastewater. However, stringent effluent limitations imposed by various governmental regulations and/or statutes limit heavy metal concentrations to levels below those which can practically be achieved by hydroxide precipitation, particularly where the wastewater contains interfering chemical species which may hinder heavy metal ion removal.

Another well known method for heavy metal ion removal from aqueous solutions is sulfide precipitation. Theoretically, metal sulfide precipitates are less soluble than metal hydroxide precipitates. The sulfide, it is believed, has a greater affinity for metal ions than does the hydroxide due to the lower solubility of the sulfide. Insofar as sulfide precipitation reactions are understood, it appears that sulfide precipitates dissociate in aqueous solutions to a level defined by their solubility products; species of lower solubility have a greater tendency to exist in precipitated form; and lower solubility sulfides preferentially form and precipitate from an aqueous solution containing a number of competing heavy metal ions. U.S. Pat. No. 3,740,331-Anderson et al shows in Table I the equilibrium sulfide ion concentration for several of the more common heavy metal sulfides as calculated from their solubility products. The heavy metal ions are arranged in descending order of sulfide solubility. Thus, the sulfide of each heavy metal in the Table can be used as a source of sulfide ions to precipitate from aqueous solution each of the heavy metal ions below it in the Table. It will be appreciated that of the more common heavy metal ions, only the sulfide of manganese is more soluble than the sulfide of ferrous iron. Therefore, ferrous sulfide is generally recognized as being a desirable reactant for addition to wastewater to precipitate, as sulfides, the heavy metal pollutant ions therefrom. This is, essentially, the teaching of U.S. Pat. No. 3,740,331-Anderson et al which discloses a method for removing heavy metal pollutant ions from aqueus solutions by adding to the solutions sulfide ion as well as a soluble salt of a heavy metal ion that forms a more soluble sulfide than the heavy metal pollutants which are to be removed from the solution. A related method is taught in U.S. Pat. No. 4,102,784-Schlauch which discloses a method of precipitating heavy metal pollutant ions from aqueous solution by forming an insoluble metal sulfide slurry, such as a ferrous solfide slurry, and adding the slurry to the aqueous solution to precipitate the heavy metal pollutant ions as sulfides in preference to the more soluble metal (ferrous) sulfide added to the solution.

It has been found that certain industrial effluents, for example foundry and galvanizing plant wastewater, contain chemical species, such as ammonium ions from the ammonium chloride used in the galvanizing flux, which act as chelating agents to hinder effective heavy metal ion removal. For example, ammonium ions hinder effective zinc removal to the point that even under optimum pH and other conditions, the minimum practically attainable zinc levels by either conventional hydroxide or ferrous sulfide precipitation techniques are well above the established acceptable effluent limitations for zinc. In other wastewater streams other chemical species may interfere with the removal of other heavy metal ion pollutants. It is therefore the purpose of the present invention to overcome previously encountered difficulties and to provide an efficient, simple and relatively inexpensive method for the effective removal of heavy metal ion pollutants from aqueous solution, even where removal-hindering interfering chemical species are present in the solution. Better removal is still obtained in the absence of chelating agents.

DISCLOSURE OF THE INVENTION

In one aspect of the present invention this is accomplished by providing a method for the removal of heavy metal ions from an aqueous solution which comprises the steps of admixing an aqueous slurry of $FeS_2$ with a heavy metal ion-bearing aqueous solution at a pH above about 7, the slurry containing at least the stoichiometric amount of $FeS_2$ required to precipitate the heavy metal ions from the solution as sulfides, and separating the precipitated heavy metal sulfides from the aqueous solution.

In another aspect of the invention, the $FeS_2$ slurry is admixed with the heavy metal ion-bearing solution at a pH in the range 8 to 12 and contains from 2 to 6 times the stoichiometric amount of $FeS_2$ required to precipitate the heavy metal ions from the solution as sulfides.

In still another aspect of the present invention, prior to precipitating the heavy metal sulfides from solution with the $FeS_2$ slurry, the heavy metal ion-bearing aqueous solution is admixed with an alkaline compound, such as lime or caustic, to precipitate a portion of the heavy metal ions from the solution as hydroxides, and the precipitated heavy metal hydroxides are separated from the aqueous solution.

BEST MODE FOR CARRYING OUT THE INVENTION

According to the present invention a method is provided for the formation of heavy metal sulfide precipitates from a heavy metal laden wastewater by admixture and reaction of the wastewater with an iron pyrite ($FeS_2$) slurry. Exemplary of the more common heavy metals encountered in wastewaters are manganese, iron, zinc, nickel, tin, cobalt, lead, cadmium, silver, bismuth, copper and mercury. The present method maximizes the extent of heavy metal precipitation even in instances where chelating agents or other interfering chemical compounds are present in the wastewater. As a consequence, the wastewater resulting from the instant process is optimized from an effluent standpoint in that it contains a minimum possible concentration of heavy metal ions.

An iron pyrite slurry is formed by admixing commercially available iron pyrite with process water, desirably in a slurry make-up feed tank. In view of the highly insoluble nature of FeS$_2$ is has been found that a 1–2% by weight slurry is easiest to work with. However, it will be appreciated that other slurry concentrations are suitable and will likely work as well. Agitation of the slurry is substantially continuous and sufficient to maintain the highly insoluble FeS$_2$ in suspension. The slurry is pumped, gravity or force fed, or otherwise conducted, on a flow proportional basis, to a wastewater reaction vessel wherein it is admixed with the heavy metal ion containing wastewater. At least the stoichiometric amount of FeS$_2$ is provided to the reaction vessel to precipitate the heavy metal ion content of the wastestream as sulfides. However, as a practical matter, since the precise composition of the wastestream is seldom known and to take into account the likely presence of competing chemical species, it is advisable that the slurry be fed into the reaction vessel at a rate sufficient to provide at least twice the stoichiometric amount of sulfide necessary and, desirably, from 2 to 6 times the stoichiometric amount of sulfide necessary. In most cases it is believed unnecessary and wasteful to provide more than six times the stoichiometric amount of FeS$_2$ necessary to precipitate the heavy metal ion content of the wastewater. Desirably, the reaction mixture within the reaction vessel is maintained at a pH of at least 7, preferably 8 to 12, and most desirably 9 to 10, to avoid possible formation of H$_2$S gas and to allow dissociation of the FeS$_2$ to form iron hydroxide and to free the disulfide ion to react with the heavy metal ion content of the wastewater. Preferably, pH control is accomplished by controlling the pH of the wastewater stream, for example by direct addition thereto of alkaline pH adjusting compounds, such as lime or caustic soda. If desired, other means for pH control may be utilized, such as direct addition of pH adjusting compounds to the reaction vessel or, less desirably, to the FeS$_2$ slurry fed to the reaction vessel.

Within the reaction vessel the FeS$_2$ slurry and wastestream are rapidly agitated by suitable mixers for about 5–10 minutes to allow sufficient time for the sulfide-heavy metal reaction to occur and for the heavy metal sulfide precipitates to form. The heavy metal sulfide precipitates may be separated from the wastewater by any of a variety or combination of well known techniques. Desirably, the reaction mixture is allowed to flocculate for about 20 minutes with gentle agitation to allow the sulfide precipitates to form and grow. If desired, a small amount, about 2–4.5 mg/l, of a flocculating polymer, such as Percol 727, a commercially available highly anionic polymer, may be added to the reaction mixture during flocculation to enhance the agglomeration and size increase of the precipitate particles. At the end of the flocculating period the precipitate-containing wastewater is forced or gravity fed through one or more filters, such as sand filter beds, and/or anthracite filter beds, or the like, to remove the precipitated sulfides. It will, of course, be appreciated that any other suitable filter may also be used.

It is believed that the highly alkaline conditions to which the wastewater is subjected cause a proportion of the heavy metal ions in the wastewater to form heavy metal hydroxide compounds [M(OH)$_x$]. These compounds, as well as the heavy metal ions (M$^{+x}$) in the wastewater, react with the disulfide supplied by the iron pyrite (FeS$_2$) to form the insoluble heavy metal sulfide precipitates (MS$_x$) according to the following chemical relationships:

$$M(OH)_x + FeS_2 \ldots MS_x + Fe(OH)_x$$

$$M^{+x} + FeS_2 \ldots MS_x + Fe^{++}$$

In another embodiment of the present invention, a still more effective method for heavy metal ion removal from aqueous solution involves an alkaline pretreatment of the heavy metal ion containing wastewater prior to sulfide precipitation with FeS$_2$. According to this embodiment, alkaline chemicals, such as hydrated lime, caustic soda, etc., are admixed with the wastewater to raise its pH to the range 8 to 12, preferably 9 to 10, and to cause precipitation of heavy metal hydroxides. The heavy metal hydroxide precipitates may be separated from the wastewater by any of a number of well known techniques. One effective method is by clarification, according to which the floc or precipitate containing alkaline wastewater is allowed to settle with gentle agitation and with the preferred addition of a flocculating polymer such as Percol 727. The supernatant clarified wastewater stream, freed of a substantial proportion of its heavy metal ions by decanting to remove the settled heavy metal hydroxide precipitate particles, but still containing some unsettled heavy metal hydroxide floc, may now be subjected to FeS$_2$ precipitation, such as hereinbefore described. It will, of course, be appreciated that considerably less FeS$_2$ will now be required, by contrast with a process wherein sulfide is required to precipitate all of the heavy metal ion values in the wastewater, resulting in substantial savings in pyrite costs.

The present invention will be better understood and its attendant advantages will become apparent from the following illustrative example.

EXAMPLE

Wastewater samples were taken from a galvanizing process waste stream which contained a number of heavy metal ion pollutants as well as ammonium ion derived from the ammonium chloride used in the galvanizing flux. The pH of the raw wastewater prior to treatment was 6.9 Initially the wastewater was flocculated with rapid mixing and addition of Percol 727 and allowed to settle. The clarified wastewater was decanted and the settled solids removed. To the clarified wastewater a 10% lime slurry was added until the pH of the wastewater was adjusted to about 9.7. Percol 727 was added, the wastewater was rapidly mixed and then was allowed to settle. The clarified wastewater was decanted and all settled solids were removed. A 2% aqueous slurry of commercially available FeS$_2$ was formed and fed with the clarified wastewater to a mix tank until the FeS$_2$ concentration reached about 40 mg/l. With the pH maintained at about 9.7 substantial floc formation could be observed. Percol 727 was added, the reaction system was rapidly mixed and then was allowed to settle for about 10–20 minutes. The wastewater-iron pyrite reaction liquor, including solids, was passed through a sand bed filter to remove solid materials and the clear filtrate was collected. An analysis of the filtrate was made for heavy metals such as zinc, copper, lead, cadmium, chromium and iron remaining therein. It was found that the concentration of each was approximately as follows:

|          | mg/l    |
| -------- | ------- |
| Zinc     | <0.005  |
| Copper   | 0.02    |
| Lead     | <0.005  |
| Cadmium  | 0.035   |
| Chromium | <0.05   |
| Iron     | 0.05    |

Prior efforts at removing heavy metal ion pollutants from these wastewater samples using either conventional hydroxide precipitation with hydrated lime or conventional sulfide precipitation with a ferrous sulfide slurry at lime adjusted pH's in the range 8.5 to 11 were successful in substantially removing all metals except zinc. Zinc removal was hindered, it is believed, by the chelating effect of ammonium ion on zinc. Even under the most favorable conditions, hydroxide precipitation was able to reduce the zinc concentration to only about 4.80 mg/l and sulfide precipitation, using 750 mg/l ferrous sulfide at pH 10.5, was able to reduce the zinc concentration to only about 1.72 mg/l. These relatively high zinc concentration values confirm that neither process provided adequate wastewater treatment and neither was able to achieve the NPDES effluent limitation for zinc of 0.4 mg/l. A process which combined lime precipitation and ferrous sulfide precipitation was able to achieve the NPDES effluent limitation but was unable to match the very low zinc concentrations obtained using iron pyrite. These low zinc concentrations are believed due, at least in part, to the fact that the heavy metal sulfide precipitates formed by reaction with iron pyrite have a larger particle size and permit the effluent to be more completely filtered.

INDUSTRIAL APPLICABILITY

The present method for removal of heavy metal ions from an aqueous solution is broadly applicable to the treatment of all heavy metal ion containing wastewater streams and is particularly beneficial and useful in instances wherein chelating agents or other interfering chemical compounds are present in the wastewater. Moreover, the method appears to be an economically reasonable approach to solving the problem of cleaning-up industrial effluents in that the equipment and chemicals employed are generally available and relatively inexpensive. In particular, use of iron pyrite, which is commercially available at 50 to 70% of the cost of the more commonly used ferrous sulfide, may represent a significant cost reduction when optimal concentration levels are established for particular applications.

We claim:

1. A method for the removal of heavy metal ions from an aqueous solution, comprising the steps of:
    admixing an aqueous slurry of $FeS_2$ with a heavy metal ion bearing aqueous solution at a pH above 7, said slurry providing at least the stoichiometric amount of $FeS_2$ for precipitating said heavy metal ions from said solution as sulfides; and
    separating said precipitated sulfides from said aqueous solution.

2. A method, as claimed in claim 1, further including the step of separating said precipitated sulfides by filtration.

3. A method, as claimed in claims 1 or 2, wherein said slurry provides at least twice the stoichiometric amount of $FeS_2$.

4. A method, as claimed in claims 1 or 2, wherein said slurry provides from two to six times the stoichiometric amount of $FeS_2$.

5. A method, as claimed in claim 3, wherein said aqueous solution is at a pH in the range 8 to 12 during said $FeS_2$ slurry admixing step.

6. A method, as claimed in claim 5, wherein said aqueous solution is at a pH in the range 9 to 10 during said $FeS_2$ slurry admixing step.

7. A method, as claimed in claim 3, further including the step of preparing an aqueous slurry comprising 1–2% by weight $FeS_2$ for admixture with said heavy metal ion bearing aqueous solution.

8. A method, as claimed in claims 1 or 2, further including the steps of precipitating a portion of the heavy metal ions from said aqueous solution as heavy metal hydroxides and separating said precipitated hydroxides from said aqueous solution prior to admixing said solution with said $FeS_2$ slurry.

9. A method, as claimed in claim 8, wherein said step of precipitating heavy metal ions from said aqueous solution as heavy metal hydroxides comprises admixing said heavy metal ion bearing aqueous solution with sufficient of an alkaline pH adjusting compound to adjust the solution pH to the range 8 to 12.

10. A method, as claimed in claim 9, wherein said step of precipitating heavy metal ions from said aqueous solution as heavy metal hydroxides comprises admixing said heavy metal ion bearing aqueous solution with sufficient of an alkaline pH adjusting compound to adjust the solution pH to the range 9 to 10.

11. A method, as claimed in claim 9, wherein said aqueous solution is at a pH in the range 8 to 12 during said $FeS_2$ slurry admixing step and said slurry provides at least twice the stoichiometric amount of $FeS_2$.

12. A method, as claimed in claim 11, wherein said alkaline pH adjusting compound adjusts said solution pH to the range 9 to 10 and said aqueous solution is at a pH in the range 9 to 10 during said $FeS_2$ slurry admixing step.

* * * * *